United States Patent
Gehlaut et al.

(10) Patent No.: US 10,957,080 B2
(45) Date of Patent: Mar. 23, 2021

(54) AUTOMATIC ILLUSTRATOR GUIDES

(71) Applicant: ADOBE INC., San Jose, CA (US)

(72) Inventors: Tarun Gehlaut, Haryana (IN); Tarun Beri, Uttar Pradesh (IN); Prashant Kumar Singh, Ghaziabad (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/373,019

(22) Filed: Apr. 2, 2019

(65) Prior Publication Data

US 2020/0320756 A1    Oct. 8, 2020

(51) Int. Cl.
 *G06T 11/20* (2006.01)
 *G06N 3/08* (2006.01)
 *G06T 11/80* (2006.01)
 *G06T 11/40* (2006.01)

(52) U.S. Cl.
 CPC .............. *G06T 11/203* (2013.01); *G06N 3/08* (2013.01); *G06T 11/40* (2013.01); *G06T 11/80* (2013.01)

(58) Field of Classification Search
 None
 See application file for complete search history.

(56) References Cited

U.S. PATENT DOCUMENTS

| | | | | |
|---|---|---|---|---|
| 7,352,902 B2* | 4/2008 | Li | .......................... | G06K 9/222 382/206 |
| 10,168,899 B1* | 1/2019 | Feiszli | ................. | G06F 3/04883 |
| 2004/0001649 A1* | 1/2004 | Simmons | ............... | G06K 9/222 382/321 |
| 2005/0062740 A1* | 3/2005 | Tobita | .................. | G06F 3/04883 345/427 |
| 2006/0045343 A1* | 3/2006 | Tremblay | ........... | G06K 9/00402 382/186 |
| 2006/0114252 A1* | 6/2006 | Ramani | .................. | G06F 16/532 345/419 |
| 2006/0126093 A1* | 6/2006 | Fedorovskaya | ........... | G06T 7/44 358/1.14 |
| 2009/0322775 A1* | 12/2009 | Fukuda | .................... | G06T 11/60 345/581 |

(Continued)

OTHER PUBLICATIONS

Kara, Levent Burak, and Thomas F. Stahovich. "Hierarchical parsing and recognition of hand-sketched diagrams." Proceedings of the 17th annual ACM symposium on User interface software and technology. 2004.*

(Continued)

*Primary Examiner* — Sultana M Zalalee
(74) *Attorney, Agent, or Firm* — F. Chau & Associates, LLC

(57) ABSTRACT

Systems and methods are described for generating automatic illustrator guides. The method may include generating a plurality of candidate guides for a digital image (e.g., using an automated shape detection engine), where each of the plurality of candidate guides is a simple shape such as a line or a circle, combining at least two of the candidate guides based on the shape information to create refined candidate guides, generating a pixel coverage map for each of the refined candidate guides, prioritizing the refined candidate guides based on the corresponding pixel coverage maps, selecting one or more drawing guides from the one or more refined candidate guides based on the prioritization, and displaying the digital image along with the one or more drawing guides.

20 Claims, 7 Drawing Sheets

(56) References Cited

U.S. PATENT DOCUMENTS

| | | | | |
|---|---|---|---|---|
| 2009/0324076 | A1* | 12/2009 | Kolmykov-Zotov | G06K 9/00409 382/170 |
| 2014/0022257 | A1* | 1/2014 | Berg | G06T 11/206 345/441 |
| 2014/0313216 | A1* | 10/2014 | Steingrimsson | G06K 9/00402 345/589 |
| 2015/0193972 | A1* | 7/2015 | Algreatly | G06F 30/00 345/420 |
| 2015/0213305 | A1* | 7/2015 | Sundstrom | G06F 16/54 382/118 |
| 2015/0221070 | A1* | 8/2015 | Winnemoeller | G06K 9/00422 382/203 |
| 2016/0155248 | A1* | 6/2016 | Ng | G06T 11/20 345/441 |
| 2017/0109578 | A1* | 4/2017 | Bednarowicz | G06K 9/00416 |
| 2019/0114778 | A1* | 4/2019 | Lee | G06T 7/13 |
| 2019/0122404 | A1* | 4/2019 | Freeman | G06T 7/251 |

OTHER PUBLICATIONS

Xiao, Changcheng, Changhu Wang, and Liqing Zhang. "PPTLens: create digital objects with sketch images." Proceedings of the 23rd ACM international conference on Multimedia. 2015.*

Google Images—Wikipedia, 4 pages [online at the internet: https://en.wikipedia.org/wiki/Google_Images], [Last visited Jul. 2, 2019].

Canny edge detector—Wikipedia, 8 pages [online at the internet: https://en.wikipedia.org/wiki/Canny_edge_detector]. [Last visited Jul. 2, 2019].

* cited by examiner

AUTOMATIC ILLUSTRATOR GUIDES

BACKGROUND

The following relates generally to generating drawing guides, and more specifically to automatically generating illustrator guides based on a rough sketch.

Many people draw hand sketches either for business or personal enjoyment. In many cases, these sketches are either made with the help of a digital device, or imported into a digital device for editing. The process of digitizing an image may either be done manually, or with an automatic tool. The digitized image may be in the form of two-dimensional vector graphics, which are defined in terms of points connected by lines and curves to form polygons and other shapes.

In some cases, digitizing a hand sketched image results in a large number of points (i.e., anchor points), which may make it difficult and time consuming to edit the drawing. For example, to edit the drawing may require manually editing a very large number of independent points.

SUMMARY

A method for automatically generating illustrator guides based on a rough sketch is described. The method may include generating a plurality of candidate guides for a digital image, wherein each of the plurality of candidate guides comprises shape information corresponding to a shape category from a predetermined set of shape categories, combining at least two of the plurality of candidate guides based on the corresponding shape information to create a plurality of refined candidate guides, generating a pixel coverage map for each of the plurality of refined candidate guides, prioritizing the plurality of refined candidate guides based at least in part on the corresponding pixel coverage maps, selecting one or more drawing guides from the one or more refined candidate guides based at least in part on the prioritization, and displaying the digital image along with the one or more drawing guides.

An apparatus for generating drawing guides is described. The apparatus may include a processor, memory in electronic communication with the processor, and instructions stored in the memory. The instructions may be operable to cause the processor to generate a plurality of candidate guides for a digital image; generate a pixel coverage map for each of the plurality candidate guides; prioritize the plurality of candidate guides based at least in part on the corresponding pixel coverage maps; select one or more drawing guides from the plurality of candidate guides based at least in part on the prioritization; remove a set of pixels corresponding to the one or more selected drawing guides; identify a modified coverage map for each of the plurality candidate guides excluding the one or more drawing guides; reprioritize a remaining portion of the plurality of candidate guides excluding the one or more drawing guides based on the modified coverage maps; select one or inure additional drawing guides based on the reprioritization; and repeat a process for selecting and reprioritizing candidate guides until a termination condition is met for generating a complete set of drawing guides.

A non-transitory computer readable medium storing code for generating drawing guides is described. In some examples, the code comprises instructions executable by a processor to: generate a plurality of candidate guides; perform automatic edge detection on the digital image to identify a set of edge pixels; group the set of edge pixels into a plurality of objects; filter the plurality of object based on a threshold size; determine whether each of the set of edge pixels corresponds to each of the plurality of candidate guides based on the filtering; generate a pixel coverage map for each of the plurality of candidate guides based on the determination; prioritize the plurality of candidate guides based at least in part on the corresponding pixel coverage maps; and select one or more drawing guides from the one or more refined candidate guides based at least in part on the prioritization.

DETAILED DESCRIPTION

Figure 1:
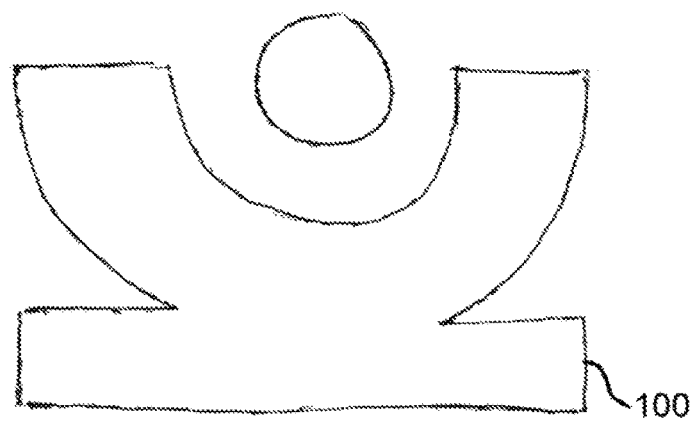
FIG. 1 shows an example of a transformation of a hand sketch into a digital image with drawing guides in accordance with aspects of the present disclosure.
Figure 1:
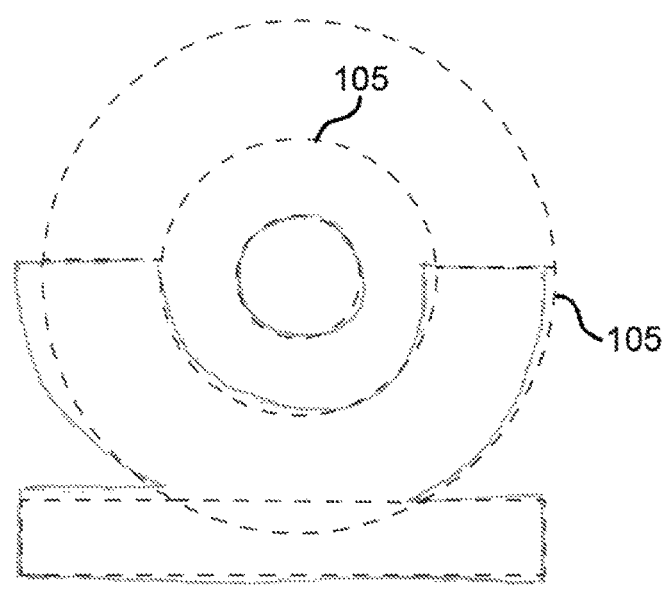
Figure 1:
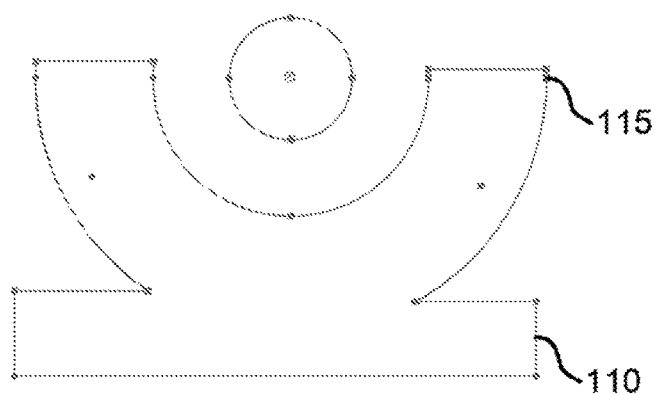

The description set forth below is intended as a description of various embodiments and is not intended to represent the only configurations in which the subject matter of this disclosure can be practiced. It will be clear and apparent that the subject matter of this disclosure is not limited to the specific details set forth herein. In some instances, structures and components are shown in block diagram form to avoid obscuring the concepts of the subject matter of this disclosure.

The present disclosure relates to a process for generating drawing guides for a digital image (e.g., a hand sketch that has been converted to a digital image). Digitizing a hand sketched image may, result in a large number of points (i.e., anchor points), which may make it difficult and time consuming to edit the drawing. Furthermore, it is sometimes desirable to edit an image in a manner that makes it more symmetric. The drawing guides described in the present disclosure may provide a visual guide for making edits that improve the symmetry of an image, and may facilitate efficient editing of anchor points.

Many users prefer to draw rough sketches on paper (i.e., as opposed to using a software application). In some cases, these images may then be digitized and imported into a software application. One way of digitizing an image involves manual tracing. For example, users may hand-draw a paper-based sketch inside the software application and manually fit smooth Bezier curves on their design. This method may be time consuming and prone to error.

Alternatively, some software applications may include an automatic image tracing function. An automatic image tracing function may read an image (e.g., a paper sketch) and converts it to a vector image. However, in some cases this technique generates a large number of anchor points as discussed above, which makes further editing and coloring difficult. Also, since rough sketches are not perfect (for example, hand-drawn circles are not perfect circles and imperfect straight lines appear like small curves), errors may get propagated to the vectorized image. The large number of anchor points may make it very difficult to correct these curves.

Thus, according to the present disclosure an input hand-drawn sketch may be used to generate a set of guides that steer a user in quickly and efficiently tracing a digital version of the sketch in a software application. These guides may be purposely limited to basic shapes like lines, circles and ellipses. The guides may also act as an intermediate step between a paper sketch and an image trace output (i.e., to reduce the number of anchor points or to improve the symmetry of the digitized image). Users may snap their drawings to these guides to further improve the images. For example, once the guides are generated, they may be used to influence the snapping behavior and help in creating beautiful artwork.

Compared to conventional methods of converting hand sketches and other rough images, the present disclosure provides systems and methods that save time by automatically providing drawing guides to which users can snap anchor points, and by reducing the number of anchor points that need to be edited in order to introduce a desirable level of symmetry to a drawing. In some examples, the number of anchor points may be reduced by selecting a few simplified shapes based on portions of an image that follow closely, but not exactly, the curves of those simplified shapes. In a vector drawing, representing a simplified curve may be done with far fewer anchor points than a similar shape or curve that deviates slightly from the simple version. Thus, by automatically selecting a suitable set of simplified shapes as drawing guides, the task of digitizing and cleaning a rough sketch may be made more efficient and less prone to error.

In some embodiments, the generated guides are in the form of ellipses and lines. In some embodiments, circular guides are a special case of ellipse, but sometimes circles may be contextually more meaningful, and thus may be given special status. For examples, guides that are close to being circular may be adjusted to make circles (or circular arcs).

Before generating the guides, the image may optionally be "cleaned" using an artifact removal process (for example, to remove irregular stroke size introduced by a blunt pencil). Artifact removal may be based on a deep learning process. Then, the image may be converted to grayscale and a set of candidate guides may be generated. The candidate guides may represent a set of shapes that encompass the sketch, and may be limited to a small set of shapes such as lines and arcs (i.e., of circles and ellipses). Once the candidate guides are created, they may be simplified by combining guides with a similar shape and position.

The simplified set of candidate guides can be prioritized based on how many pixels of the image overlap with each candidate guide. Based on the prioritization, a drawing guide may be selected. Then, the remaining candidate guides may be reprioritized (i.e., by excluding the pixels overlapping the selected guide) and the selection process may be repeated until the complete set of drawing guides is selected (based on termination conditions described herein).

In some examples, the drawing guides may be used to create a vector graphics version of the digital image that uses a reduced number of anchor points. Additionally or alternatively, they may be used to facilitate making edits to the image (e.g., to increase the symmetry of the image). For example, the image may be edited by "snapping" anchor points of the image to the drawing guides. In yet another example, the drawing guides may be used to perform automatic edits to an image.

Throughout the present disclosure, the terms "drawing guides and "illustrator guide" may be used interchangeably to represent one of a set of simplified shapes that may be used to efficiently edit a digital image. The term "candidate guide" may refer to precursor (i.e., an intermediate shape) that is used to generate the drawing guides.

FIG. 1 shows an example of a transformation of a hand sketch 100 into a digital image 110 with drawing guides 105 in accordance with aspects of the present disclosure. The example shown includes hand sketch 100, drawing guides 105, digital image H 0, and anchor points 115.

Embodiments of the present disclosure describe systems and methods for digitizing and editing a drawing such as a hand sketch 100. For example, the method may include the creation of guides (i.e., drawing guides 105) that may assist a designer in quickly and efficiently tracing a digital version of a rough sketch in an image creation/editing program. The guides may include basic shapes such as lines, polygons, circles, and ellipses. In some examples, the guides may serve as an intermediate step between the paper sketch and the final output.

In some embodiments, a method of generating a digital image 110 using drawing guides 105 may result in a reduced number of anchor points 115, and may enable the digital image 110 to be more easily modified and more symmetric compared with methods that do not utilize drawing guides 105. For example, an image editing program may overlay the guides on a sketch to allow a user to manually trace over the sketch using these guides, or to quickly edit anchor points 115 by 'snapping' them to a drawing guide 105.

In many cases, hand sketches and other digital images 110 may include a number of inadvertent asymmetries, and the generation of drawing guides 105 may assist a user in achieving the desired level of symmetry in a drawing. For example, the drawing guides 105 may make it easier to detect if two line segments in a drawing are parallel, or if two circular arcs have symmetric center points or radii.

At least one embodiment of the present disclosure may generate drawing guides 105 from an image in three primary stages: first, optionally, the image may be simplified to reduce the number of artifacts that complicate the generation of drawing guides 105; second, a number of candidate guides are created and refined; and third, the candidate guides are prioritized and a set of final drawing guides 105 are selected and refined. In some examples, the first stage may be performed based on a machine learning system, whereas the second and third stages may be performed algorithmically.

The first stage in the process for generating drawing guides 105 may involve removing artifacts from the digital images 110 to create a "clean" version of the image. An image cleaning component may clean the input image of various drawing artifacts. Image artifacts may include inadvertent marks, small strokes made when creating large strokes and non-uniform marks (i.e., due to the continuous use of a pencil). Artifact removal may be achieved by a deep learning-based technique, e.g., using a convolution neural network. The image cleaning component may take a rough sketch as input, processes it to remove the above-mentioned artifacts, and generate a clean version of the image as output.

In some examples the image cleaning component itself may operate in three parts: first, encode and spatially compress the image (e.g., representing a Fourier transform of the image); second, extract essential pixels (discarding non-essential pixels); and third, decode the image to produce a clean version of the image.

The second stage in the process may include generating a set of candidate guides. For example, a candidate guide component may provide an array of basic shapes to be used as candidate guides. For example, the array may include lines, circles and ellipses. Lines may be defined based on their start and end coordinates (and may be associated with a slope parameter). Circles may be defined based on a center point and a radius, and ellipses may be characterized by a center point (or foci), the lengths of major and minor segments, and a rotation parameter for the major axis. Segments of circles and ellipses (i.e., arcs) may also be associated with start and end angles. In some cases, other shapes and polygons may also be used. In some cases, the set of shapes may be determined by a user preference.

In some cases, candidate guides may be selected based on a grayscale version of the input image. For a given set of pixels in the grey-scale image, the candidate guide component may determine whether a line segment or an elliptical arc is present. If multiple interpretations are possible for the same region, the candidate guide component may choose the interpretation that best explains the data. In some examples, the candidate guide component may identify candidate guides using predefined statistical criteria. In other examples, a machine learning model may be used to train a candidate guide detector, i.e., using a set of images with annotations representing known candidate guides.

In some cases, after the initial shape detection is performed, there may, be multiple shapes that can be simplified into a smaller set to be used as the candidate guides. For example, a number of arcs with similar center points may be simplified into a single larger arc, or into a complete circle. Also, an ellipse that is close to being a circle may be simplified into a circle. Similarly, a set of lines that is close to forming a simple polygon (i.e., a square or an equilateral triangle) may be simplified so that the line segments form the simplified shape.

In the circle example, the candidate guide component may cluster arcs on the basis of their position and radius. That is, arcs which have a center and radius within a threshold may be combined to form new unified arcs. The new center and radius may be computed based on the average of the arcs falling in one cluster. In some examples, the parameters of constituent segments that have been combined into a simplified shape may be retained for use in a later stage (e.g., in the creation of coverage maps for the candidate guides).

The third stage in the process may include selecting one or more drawing guides 105. For example, a drawing guide component may take a number of candidate guides as an input and output a reduced number of drawing guides 105 selected from the set of candidate guides. In some cases, an input grayscale image may include various shades of gray. The drawing guide component may determine a threshold grayscale level below which a pixel is not considered to be "occupied". In some cases, this may be equivalent to converting a grayscale image to a monochrome image that includes "occupied" and "unoccupied" pixels.

For every candidate guide, the drawing guide component may compute a priority (i.e. a probability of being selected as a drawing guide). Priority may be determined based on a linear interpolation of two factors—a number of occupied pixels covered, and a length of the segment. In general, the more complete an arc is, the higher its priority. For example, an arc with an angle (i.e., end angle–start angle) of 15 degrees will have lower priority than an arc with a corresponding value of 30 degrees (even if they cover the same number of occupied pixels). But even if an arc spans a complete 360 degrees, it will have a low priority if it covers a small number of occupied pixels.

The pixel occupancy may be computed according to the following algorithm. First, an edge detection process may be performed to produce a set of edge pixels (e.g., using Canny edge detection). This may be done because it may be desirable for the guides to ignore the "filled" sections of an image when selecting drawing guides. Second, items that are too small may be filtered out (i.e., if the number of contiguous pixels is below a threshold). In some cases, small marks may represent noise and may not be useful in the selection of drawing guides 105. Third, a Boolean matrix, called a coverage map, may be generated for each candidate guide.

Edge detection may be any process used to identifying discontinuities in a digital image (e.g., where the brightness changes suddenly). In some embodiments, points where the image brightness changes sharply may be organized into a set of curved line segments (i.e., edges). For example For example, an edge detector can take an image as input and output a set of points or curved line segments representing edges. These points may be referred to as edge pixels. Edge detection may be accomplished algorithmically (e.g., by identifying when the derivative of a Gaussian of the image exceeds a threshold), or using a machine learning model. For example, a neural network may be trained using annotated images, where the annotations represent known edges in an image.

A coverage map may have a size of H×W, where H is the height of the image and W is the width of the image. The value of the (i, j) element of the coverage may represent a determination of whether the associated guide "covers" an occupied pixel at coordinates (i, j) of the input image. In some cases, the Boolean value may be based on whether the candidate guide runs through the pixel, or comes within a threshold distance of the pixel. Additionally, a total count of occupied pixels may be maintained for each candidate guide (i.e., the count of all 'true' or values in the coverage-map).

The coverage map may be computed by performing the following steps for every occupied pixel on the edge-detected image. First, detect if the pixel approximately lies on the mathematical equation of the item. For example, if the equation of a line is y=2x+3, the pixel located at (0, 3) lies on the line and the pixel at (5, 3) does not lie on the line.

In case of ellipses, the start and end angles are used to ensure that the pixel lies within the elliptical arc. Similarly, for lines a determination may be made regarding whether the point is within the range of start and end points. If yes, set coverage–map[i][j] for the candidate guide under consideration to 'true' and the associated coverage count may be increased.

Once a coverage map (and count) is created for each candidate guide, the guide with the highest priority may be selected to be a drawing guide. The remaining candidate guides may be sorted on the basis of their priority. For example, the following process may be repeated until either there are no items left, or the remaining items have a priority that is less than a predetermined threshold. First, the top item in the sorted set is declared as a drawing guide. Second, coverage maps of all other candidate guides are updated by subtracting the coverage of the top item (i.e., pixels covered by the selected item may be removed from consideration). Then, a new priority is determined for each of the remaining candidate guides.

After the drawing guides 105 are selected from the set of candidate guides, an additional processing step may be performed to improve the symmetry of the guides. For example, circles having centers within a threshold distance may be made concentric. Similarly, lines that have slopes within a threshold may be made parallel.

Once the drawing guides 105 are selected and refined, they, may be used to improve the process of generating or editing an image. For example, a designer may use a curvature, pencil, or pen tool to sketch over the drawing guides 105. The drawing guides 105 may also be used to influence snapping behavior. Furthermore, an image processing system may use the drawing guides 105 to generate a vector image with a reduced number of anchor points 115 in comparison to conventional image tracing solutions. This may enable a user to produce a more pleasing or symmetric vector image in less time than with conventional solutions. A vector image may be an image defined by points connected by lines and curves. Since the lines and curves may be defined by equations (rather than specifying specific pixels), a vector image may be scaled more easily and satisfactorily.

Figure 2:
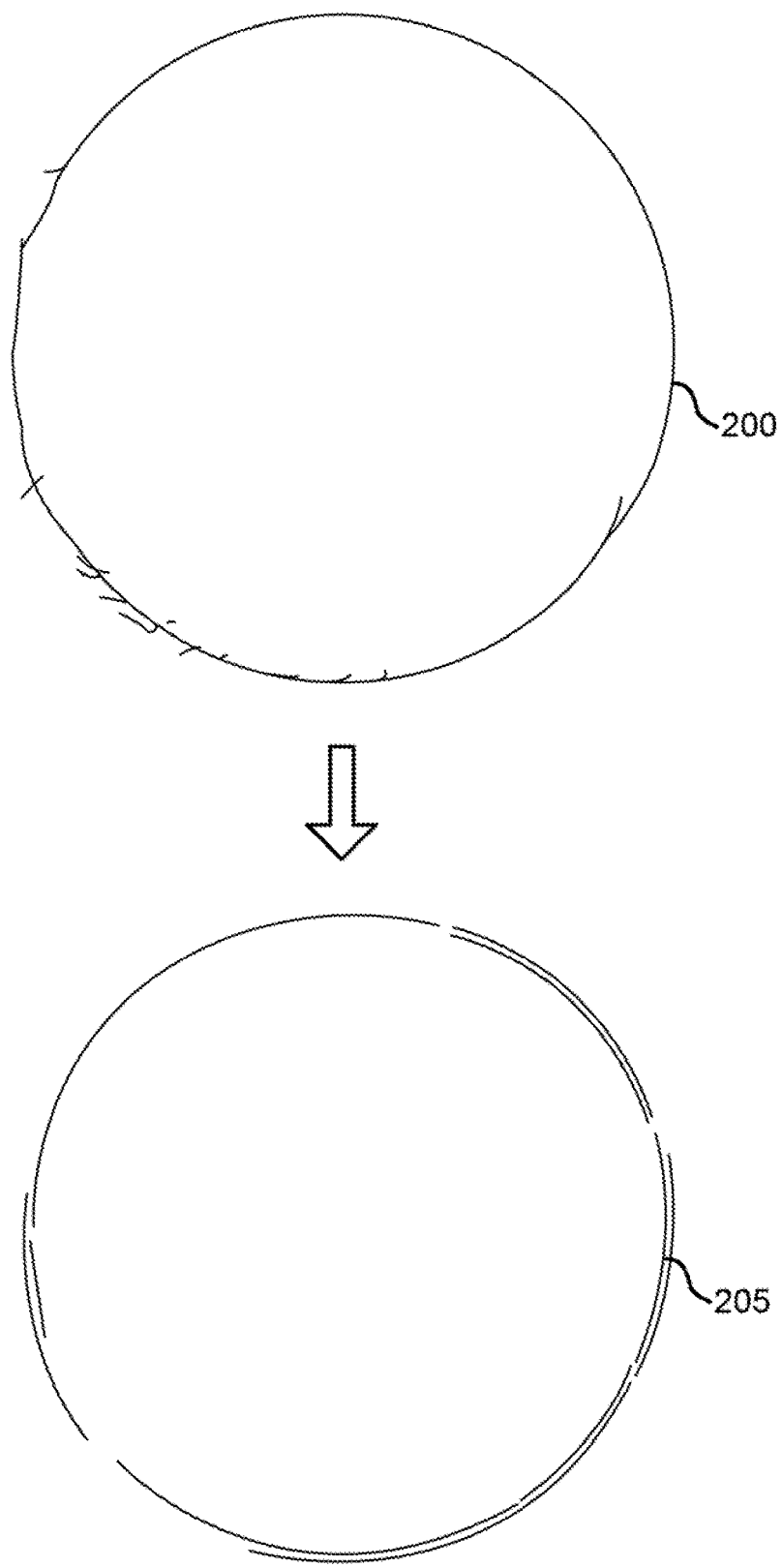
FIG. 2 shows an example of a transformation of a rough shape into a set of candidate guides in accordance with aspects of the present disclosure.

FIG. 2 shows an example of a transformation of a rough shape 200 into a set of candidate guides 205 in accordance with aspects of the present disclosure. The example shown includes rough shape 200 and candidate guides 205.

The rough shape 200 (i.e., a hand sketch) may include a number of artifacts and irregularities which may be removed (i.e., according the first stage of the process described above with reference top FIG. 1), and the remaining portions of the rough shape 200 may be used to generate one or more candidate guides 205 (i.e., according to the second stage of the process described above with reference to FIG. 1). The candidate guides may then be further refined as illustrated below with reference to FIG. 3.

In this example, the candidate guides 205 are illustrated by a number of arcs. In other examples, the candidate guides 205 could be lines, line segments, or one of another limited set of shapes.

Figure 3:
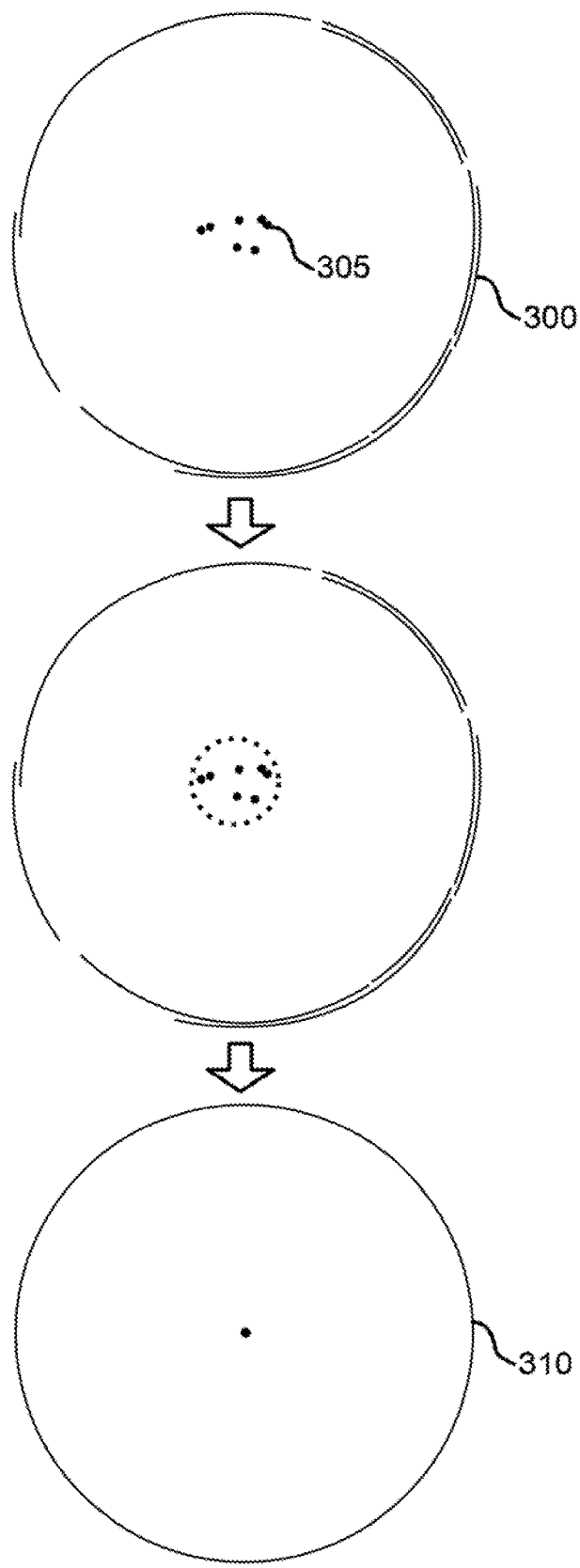
FIG. 3 shows an example of a combination of several candidate guides into a single refined candidate guide in accordance with aspects of the present disclosure.

FIG. 3 shows an example of a combination of candidate guides 300 into a single refined candidate guide 310 in accordance with aspects of the present disclosure. The example shown includes candidate guides 300 (arcs in this case), center points 305, and refined candidate guide 310.

The transformation illustrated by FIG. 3 may represent a portion of the second stage of the process described above with reference to FIG. 1. In a first step of the transformation, it may be determined that the center points 305 of the candidate guides 300 fall within a threshold distance of each other. Similarly, it may be determined that the radii of the candidate guides 300 (not shown) are within a threshold magnitude of each other.

For example, an illustrator guide system may determine that the candidate guides 300 may be represented by a single, refined candidate guide 310. The refined candidate guide 310 may have a center point determined based on the center points 305 of the candidate guides 300 (e.g., by take an average or a median of the positions of the center points 305). Similarly, the radius of the refined candidate guide 310 may be calculated based on the radii of the candidate guides 300 (e.g., by taking an average, or median, etc.).

Figure 4:
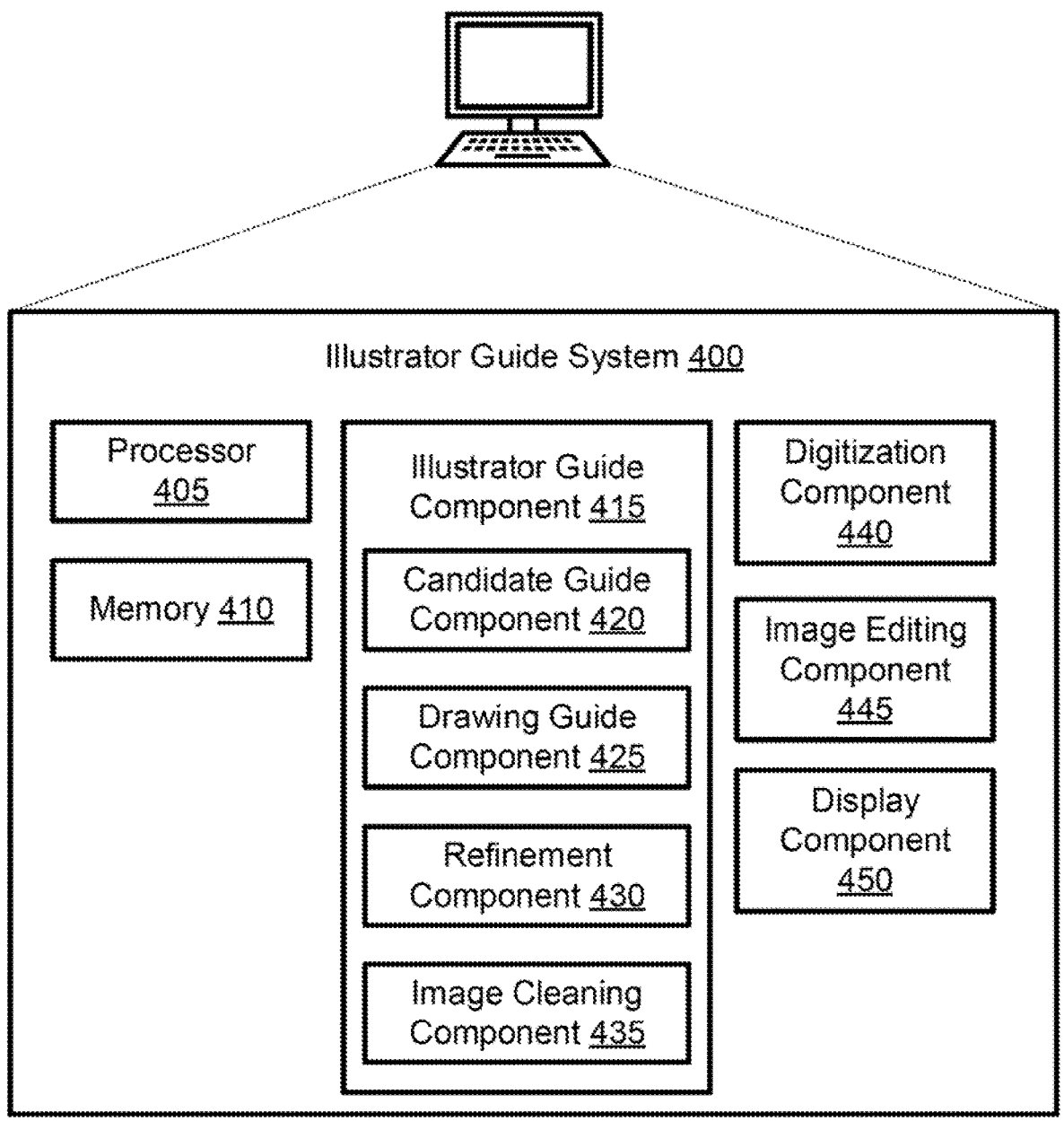
FIG. 4 shows an example of an illustrator guide system in accordance with aspects of the present disclosure.

FIG. 4 shows an example of an illustrator guide system 400 in accordance with aspects of the present disclosure. Illustrator guide system 400 may include processor 405, memory 410, illustrator guide component 415, digitization component 440, image editing component 445, and display component 450. Illustrator guide component 415 may include candidate guide component 420, drawing guide component 425, refinement component 430, and image cleaning component 435.

Candidate guide component 420 may generate a plurality of candidate guides for a digital image (e.g., using an automated shape detection engine), where each of a plurality of candidate guides comprises shape information corresponding to a shape category from a predetermined set of shape categories (i.e., as in the second stage of the process described with reference to FIG. 1). In some examples, the predetermined set of shape categories consists of a line category, a circle category, an ellipse category, a polygon category or any combination thereof. In some examples, the digital image is based at least in part on a hand sketch.

Drawing guide component 425 may generate a pixel coverage map for each of the plurality of refined candidate guides. Drawing guide component 425 may also prioritize the plurality of refined candidate guides based at least in part on the corresponding pixel coverage maps (i.e., as described above with reference to FIG. 1). Drawing guide component 425 may then select one or more drawing guides from the one or more refined candidate guides based at least in part on the prioritization (i.e., as in the third stage of the process described with reference to FIG. 1).

To generate the pixel coverage maps, drawing guide component 425 may perform automatic edge detection on the digital image to identify a set of edge pixels. Drawing guide component 425 may group the set of edge pixels into a plurality of objects. Drawing guide component 425 may then filter the plurality of objects based on a threshold size. Drawing guide component 425 may determine whether each of the set of edge pixels corresponds to each of the plurality of refined candidate guides based on the filtering, where the coverage map for each of the plurality of refined candidate guides is generated based on the determination.

Drawing guide component 425 may then determine a pixel coverage count for each of the plurality of refined candidate guides, where the plurality of refined candidate guides are prioritized based on the pixel coverage count. Drawing guide component 425 may also remove a set of pixels corresponding to the one or more selected drawing guides. Drawing guide component 425 may then identify a modified coverage map for each of the plurality refined candidate guides excluding the one or more drawing guides. Drawing guide component 425 may then reprioritize a remaining portion of the plurality of refined candidate guides excluding the one or more drawing guides based on the modified coverage maps. Drawing guide component 425 may then select one or more additional drawing guides based on the reprioritization. Drawing guide component 425 may repeat the process of selecting and reprioritizing the plurality of candidate guides until a termination condition is met. For example, the termination condition may be based on a number of remaining candidate guides (i.e., not enough candidate guides remain) or a highest priority score of the remaining candidate guides (i.e., if the highest priority score is too low).

Refinement component 430 may combine at least two of the plurality of candidate guides based on the corresponding shape information to create a plurality of refined candidate guides (i.e., as described above with reference to FIG. 3). Refinement component 430 may determine that at least one parameter of a candidate guide from the plurality of candidate guides is within a threshold amount to be considered a simplified shape. Refinement component 430 may then modify the candidate guide to create a simplified candidate guide, where the plurality of refined candidate guides are created based on the simplified candidate guide. In some examples, the simplified shape comprises a circle or a regular polygon.

Refinement component 430 may also determine that at least two of the plurality of candidate guides have a center point within a threshold distance and a radius within a threshold magnitude of each other, where the at least two of the plurality of candidate guides are combined based on the determination. Refinement component 430 may also determine that the at least two of the plurality of candidate guides have a slope within a threshold magnitude of each other, where the at least two of the plurality of candidate guides are combined based on the determination.

Refinement component 430 may also determine that two guides of the one or more drawings guides comprise circles having center points within a threshold distance of each other. Refinement component 430 may also modify at least one of the two guides based on the determination. Refinement component 430 may also determine that two guides of the one or more drawings guides comprise lines having slopes having less than a threshold difference from each other. Refinement component 430 may also modify at least one of the two guides based on the determination.

Image cleaning component 435 may generate a clean version of the digital image by eliminating one or more drawing artifacts using a convolution neural network (CNN), where the plurality of candidate guides are generated based on the clean version of the digital image. The image cleaning component 435 may perform actions related to the first stage of the process described above with reference to FIG. 1. For example, the image cleaning component may take a rough sketch as input, processes it to remove the above-mentioned artifacts, and generate a clean version of the image as output. In some examples the image cleaning component itself may operate in three parts: first, encode and spatially compress the image (e.g., representing a Fourier transform of the image); second, extract essential pixels (discarding non-essential pixels); and third, decode the image to produce a clean version of the image.

A CNN used for artifact removal may be a class of artificial neural network (ANN). An ANN may be a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal, the node can process it and the processed signal is then transmitted to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

In some examples, using a CNN for artifact removal may enable processing of digital images with minimal pre-processing, A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. Specifically, the filters of an artifact removal CNN may be trained so that they are triggered when they detect an unwanted artifact.

Digitization component 440 may digitize the hand sketch to create the digital image. Image editing component 445 may modify or facilitate user modification of the digital image based at least in part on the one or more drawing guides.

Display component 450 may display the digital image along with the one or more drawing guides. Display component 450 may also generate and display one or more anchor points for the digital image based at least in part on the one or more drawing guides. In some examples, display component 450 may generate a vector graphics representation of the digital image based at least in part on the anchor points, where the digital image is displayed based on the vector graphics representation.

Figure 5:
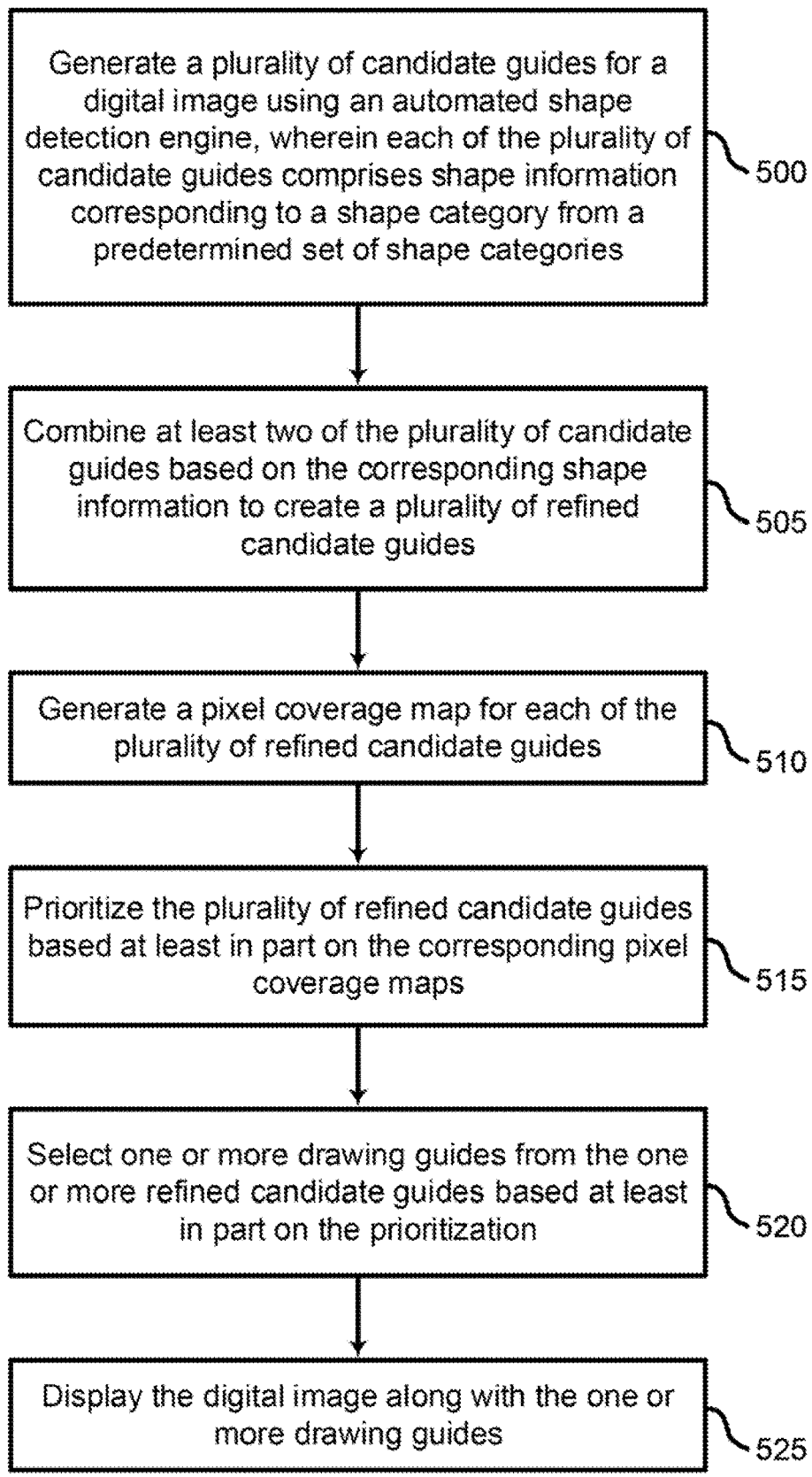
FIGS. 5 through 7 show examples of a process for automatically generating illustrator guides based on a rough sketch in accordance with aspects of the present disclosure.

FIG. 5 shows an example of a process for automatically generating illustrator guides based on a rough sketch in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, the system may generate a plurality of candidate guides for a digital image (e.g., using an automated shape detection engine), where each of the plurality of candidate guides comprises shape information corresponding to a shape category from a predetermined set of shape categories. In some cases, the operations of this step may refer to, or be performed by, a candidate guide component as described with reference to FIG. 4.

For example, a candidate guide component may generate the candidate guides as described above with reference to FIGS. 1 and 3. The candidate guides may be arcs, lines, or other simple shapes corresponding to portions of a rough sketch.

The candidate guide component may provide an array of basic shapes to be used as candidate guides. For example, the array may include lines, circles and ellipses. Lines may be defined based on their start and end coordinates (and may be associated with a slope parameter). Circles may be defined based on a center point and a radius, and ellipses may be characterized by a center point (or foci), the lengths of major and minor segments, and a rotation parameter for the major axis. Segments of circles and ellipses (i.e., arcs) may also be associated with start and end angles. In some cases, other shapes and polygons may also be used. In some cases, the set of shapes may be determined by a user preference.

In some cases, candidate guides may be selected based on a grayscale version of the input image. For a given set of pixels in the grey-scale image, the candidate guide component may determine whether a line segment or an elliptical arc is present (e.g. by comparing a potential line or shape to the pixels present in the image and returning a likelihood that the image includes the line or shape under consideration). If multiple interpretations are possible for the same region, the candidate guide component may choose the interpretation that best explains the data. In some examples, the candidate guide component may identify candidate guides using predefined statistical criteria. In other examples, a machine learning model may be used to train a candidate guide detector, i.e., using a set of images with annotations representing known candidate guides.

At step 505, the system may combine at least two of the plurality of candidate guides based on the corresponding shape information to create a plurality of refined candidate guides. In some cases, the operations of this step may refer to, or be performed by, a refinement component as described with reference to FIG. 4. For example, a refinement component may combine two or more candidate guides as described above with reference to FIGS. 1 and 4.

For example, after the initial shape detection is performed, there may be multiple lines and shapes that can be simplified into a smaller set to be used as the candidate guides. For example, a number of arcs with similar center points (i.e., if the distance between the center points is below a threshold) may be simplified into a single larger arc, or into a complete circle. Also, an ellipse that is close to being a circle (i.e., if the major and minor axis are within a threshold magnitude) may be simplified into a circle. Similarly, a set of lines that is close to forming a simple polygon (i.e., a square or an equilateral triangle) may be simplified so that the line segments form the simplified shape.

At step 510, the system may generate a pixel coverage map for each of the plurality of refined candidate guides. In some cases, the operations of this step may refer to, or be performed by, a drawing guide component as described with reference to FIG. 4. In some examples, the pixel coverage map may be generated according to the algorithm described above with reference to FIG. 1.

According to some embodiments, the pixel coverage map may be computed according to the following algorithm: First, an edge detection process may be performed to produce a set of edge pixels. Second, items that are too small may be filtered out. Third the coverage map may be generated for each candidate guide based on whether the candidate guide intersects (or falls within a threshold distance) of each occupied pixel.

At step 515, the system may prioritize the plurality of refined candidate guides based at least in part on the corresponding pixel coverage maps. In some cases, the operations of this step may refer to, or be performed by, a drawing guide component as described with reference to FIG. 4. In some examples, the prioritization may be determined according to the algorithm described above with reference to FIG. 1. For example, priority may be determined based on a linear interpolation of two factors—a number of occupied pixels covered, and a length of the segment. In general, the more complete an arc is, the higher its priority.

At step 520, the system may select one or more drawing guides from the one or more refined candidate guides based at least in part on the prioritization. In some cases, the operations of this step may refer to, or be performed by, a drawing guide component as described with reference to FIG. 4. For example, the drawing guide component may select the guide with the highest priority from the prioritized refined candidate guides.

At step 525, the system may display the digital image along with the one or more drawing guides. In some cases, the operations of this step may refer to, or be performed by, a display component as described with reference to FIG. 4. In some cases, the display component generates commands which are interpreted by a graphics engine and a display device such as a computer screen. For example, in some embodiments the display component may be a hardware component such as a display screen and in other embodiments the display component may be a software or firmware component that provides instructions to other components to display the digital image.

Figure 6:
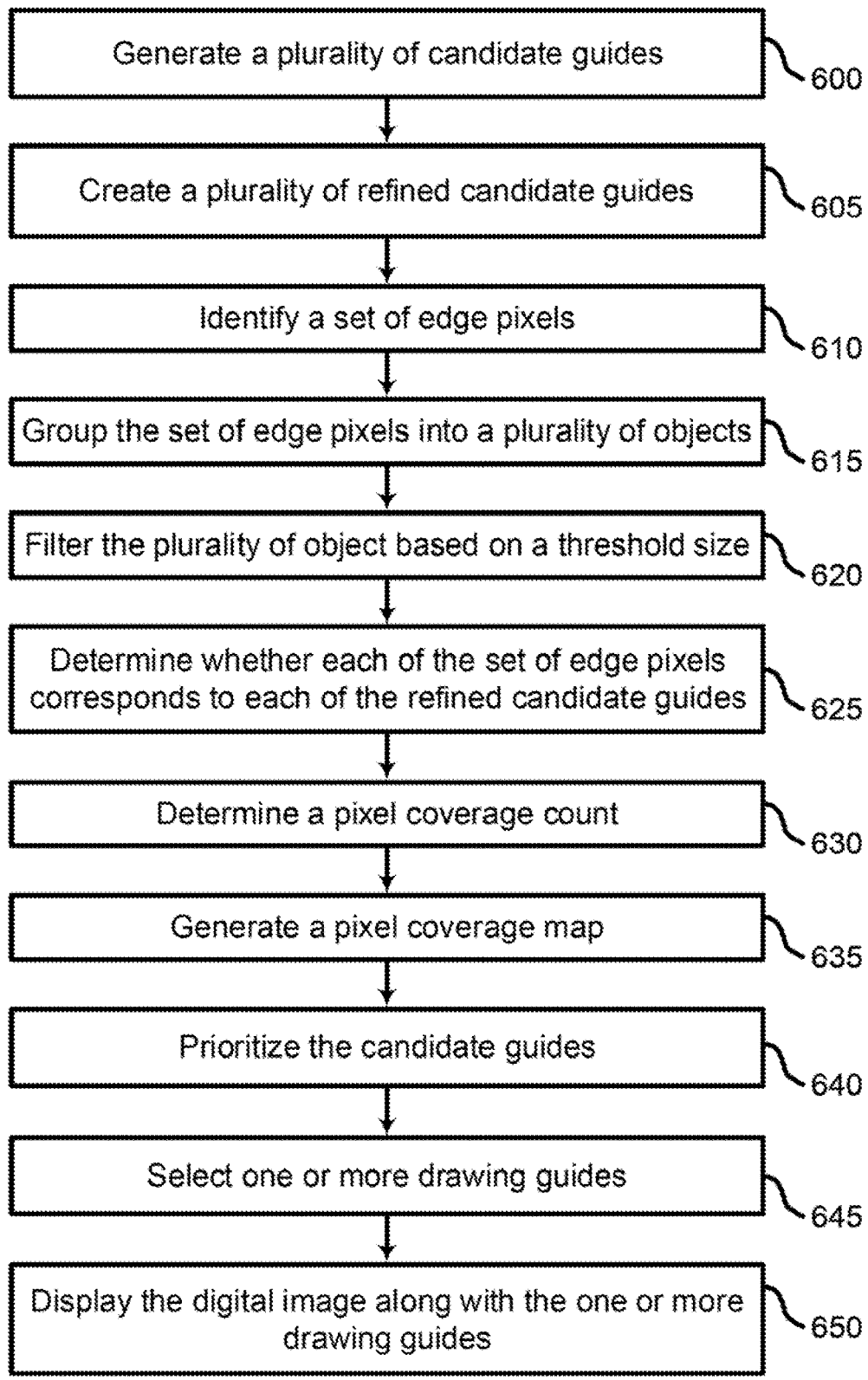

FIG. 6 shows an example of a process for automatically generating illustrator guides based on a rough sketch in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein. Some steps of FIG. 6 correspond to similar steps described above with reference to FIG. 5, and the description of these steps is simplified to avoid redundancy.

At step 600, the system may generate a plurality of candidate guides for a digital image, where each of the plurality of candidate guides comprises shape information corresponding to a shape category from a predetermined set of shape categories. In some cases, the operations of this step may refer to, or be performed by, a candidate guide component as described with reference to FIG. 4.

At step 605, the system may combine at least two of the plurality of candidate guides based on the corresponding shape information to create a plurality of refined candidate guides. In some cases, the operations of this step may refer to, or be performed by, a refinement component as described with reference to FIG. 4.

At step 610, the system may perform automatic edge detection on the digital image to identify a set of edge pixels. The edge detection may be performed to minimize the creation of excess drawing guides in filled in portions of an image. For example, in some embodiments of the present disclosure, candidate guides correspond to edges only, and not within filled in portions of an image. In some cases, the operations of this step may refer to, or be performed by, a drawing guide component as described with reference to FIG. 4. In some cases, the automatic edge detection may be performed algorithmically. In other examples, it may be performed by a machine learning algorithm. The machine learning algorithm may be trained with a set of images that are annotated with targets indicating which of the images contain edges.

At step 615, the system may group the set of edge pixels into a plurality of objects. In some cases, the operations of this step may refer to, or be performed by, a drawing guide component as described with reference to FIG. 4. For example, contiguous edge pixels may be grouped together into objects.

At step 620, the system may filter the plurality of object based on a threshold size. In some cases, the operations of this step may refer to, or be performed by, a drawing guide component as described with reference to FIG. 4. For example, objects created in step 615 may be discarded if they contain a number of pixels that is below a threshold number.

At step 625, the system may determine whether each of the set of edge pixels corresponds to each of the plurality of refined candidate guides based on the filtering. In some cases, the operations of this step may refer to, or be performed by, a drawing guide component as described with reference to FIG. 4. For example, the system may check whether the mathematical equation of a candidate guide results in a graph that passes within a threshold distance of each of the remaining edge pixels.

At step 630, the system may determine a pixel coverage count for each of the plurality of refined candidate guides. In some cases, the operations of this step may refer to, or be performed by, a drawing guide component as described with reference to FIG. 4. For example, the system may count the number of pixels each candidate guide covers or passes through based on the process described at step 625.

At step 635, the system may generate a pixel coverage map for each of the plurality of refined candidate guides. In some cases, the operations of this step may refer to, or be performed by, a drawing guide component as described with reference to FIG. 4. The pixel coverage may be represented by a Boolean matrix as described above with reference to FIG. 1 based on the determination of step 625 regarding whether a candidate guide passes through or covers each of the edge pixels.

At step 640, the system may prioritize the plurality of refined candidate guides based at least in part on the corresponding pixel coverage maps (including the pixel coverage count). In some cases, the operations of this step may refer to, or be performed by, a drawing guide component as described with reference to FIG. 4.

At step 645, the system may select one or more drawing guides from the one or more refined candidate guides based at least in part on the prioritization. In some cases, the operations of this step may refer to, or be performed by, a drawing guide component as described with reference to FIG. 4.

At step 650, the system may display the digital image along with the one or more drawing guides. In some cases, the operations of this step may refer to, or be performed by, a display component as described with reference to FIG. 4.

Figure 7:
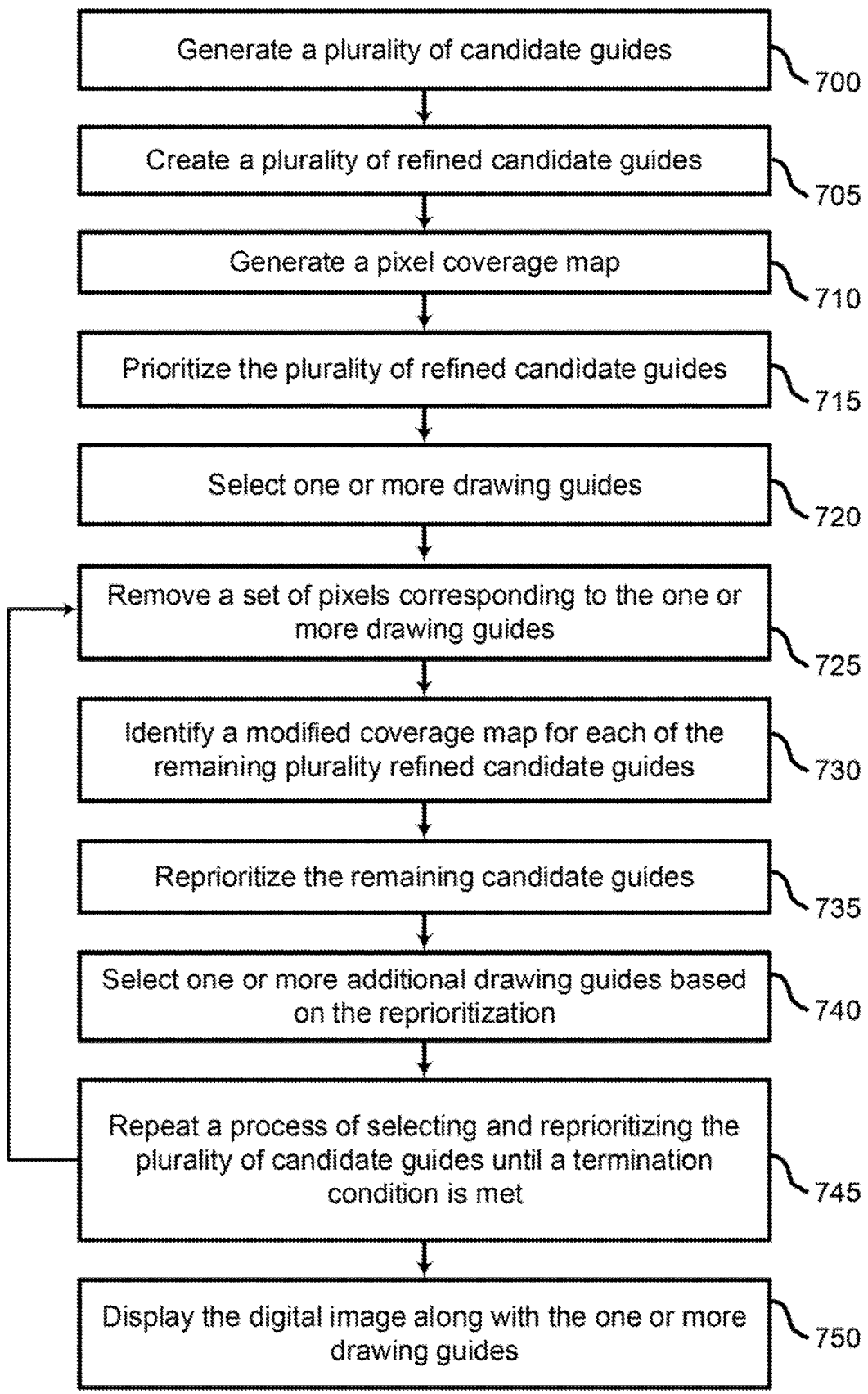

FIG. 7 shows an example of a process for automatically generating illustrator guides based on a rough sketch in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein. Some steps of FIG. 7 correspond to similar steps described above with reference to FIG. 5, and the description of these steps is simplified to avoid redundancy.

At step 700, the system may generate a plurality of candidate guides for a digital image, where each of the plurality of candidate guides comprises shape information corresponding to a shape category from a predetermined set of shape categories. In some cases, the operations of this step may refer to, or be performed by, a candidate guide component as described with reference to FIG. 4.

At step 705, the system may combine at least two of the plurality of candidate guides based on the corresponding shape information to create a plurality of refined candidate guides. In some cases, the operations of this step may refer to, or be performed by, a refinement component as described with reference to FIG. 4.

At step 710, the system may generate a pixel coverage map for each of the plurality of refined candidate guides. In some cases, the operations of this step may refer to, or be performed by, a drawing guide component as described with reference to FIG. 4.

At step 715, the system may prioritize the plurality of refined candidate guides based at least in part on the corresponding pixel coverage maps. In some cases, the operations of this step may refer to, or be performed by, a drawing guide component as described with reference to FIG. 4.

At step 720, the system may select one or more drawing guides from the one or more refined candidate guides based at least in part on the prioritization. In some cases, the operations of this step may refer to, or be performed by, a drawing guide component as described with reference to FIG. 4.

At step 725, the system may remove a set of pixels corresponding to the one or more drawing guides. In some cases, the operations of this step may refer to, or be performed by, a drawing guide component as described with reference to FIG. 4. Step 725 may represent the beginning of an iterative process for the repeated selection and reprioritization of drawing guides as described above in FIG. 1.

At step 730, the system may identify a modified coverage map for each of the plurality refined candidate guides excluding the one or more drawing guides. In some cases, the operations of this step may refer to, or be performed by, a drawing guide component as described with reference to FIG. 4. For example, the modified coverage map may represent the coverage map as it would be after removing the pixels in step 725.

At step 735, the system may reprioritize a remaining portion of the plurality of refined candidate guides excluding the one or more drawing guides based on the modified coverage maps. In some cases, the operations of this step may refer to, or be performed by, a drawing guide component as described with reference to FIG. 4. For example, the reprioritization may be performed after removing one or more pixels from consideration that overlap with a previously selected drawing guide. After the pixels are removed, a new pixel coverage map may be generated for each of the remaining candidate guides. Then the remaining candidate guides may be reprioritized based on the modified pixel coverage maps.

At step 740, the system may select one or more additional drawing guides based on the reprioritization. In some cases, the operations of this step may refer to, or be performed by, a drawing guide component as described with reference to FIG. 4.

At step 745, the system may repeat a process of selecting and reprioritizing the plurality of candidate guides until a termination condition is met, where the termination condition is based on a number of remaining candidate guides or a highest priority score of the remaining candidate guides. In some cases, the operations of this step may refer to, or be performed by, a drawing guide component as described with reference to FIG. 4.

In some cases, additional pixels may be removed from consideration prior to each cycle of prioritization and selection (i.e., pixels corresponding to all previously selected drawings guides may be removed). For example, the process may return to step 725 and cycle until the termination condition is met. The termination condition may be based on a threshold number of candidate guides (i.e., stop when no candidate guides, or less than a threshold number of guides remain), based on a number of pixels remaining, or based on a threshold priority score for the remaining candidate guides.

At step 750, the system may display the digital image along with the one or more drawing guides. In some cases, the operations of this step may refer to, or be performed by, a display component as described with reference to FIG. 4.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B, in other words, the phrase "based on" shall be construed to mean "based at least in part on,"

What is claimed is:

1. A method for generating drawing guides, comprising:
generating a plurality of candidate guides for a digital image, wherein each of the plurality of candidate guides comprises shape information corresponding to a shape category from a predetermined set of shape categories;
combining at least two of the plurality of candidate guides based on the corresponding shape information to create a plurality of refined candidate guides;
generating a pixel coverage map for each of the plurality of refined candidate guides, wherein the pixel coverage map indicates whether the corresponding refined candidate guide covers occupied pixels of the digital image;
prioritizing the plurality of refined candidate guides based at least in part on the corresponding pixel coverage maps;
selecting one or more drawing guides from the one or more refined candidate guides based at least in part on the prioritization; and
displaying the digital image along with the one or more drawing guides.

2. The method of claim 1, further comprising:
performing automatic edge detection on the digital image to identify a set of edge pixels;
grouping the set of edge pixels into a plurality of objects;
filtering the plurality of object based on a threshold size; and
determining whether each of the set of edge pixels corresponds to each of the plurality of refined candidate guides based on the filtering, wherein the pixel coverage map for each of the plurality of refined candidate guides is generated based on the determination.

3. The method of claim 2, further comprising:
determining a pixel coverage count for each of the plurality of refined candidate guides, wherein the plurality of refined candidate guides are prioritized based on the pixel coverage count.

4. The method of claim 1, further comprising:
removing a set of pixels corresponding to the one or more drawing guides;
identifying a modified coverage map for each of the plurality refined candidate guides excluding the one or more drawing guides;
reprioritizing a remaining portion of the plurality of refined candidate guides excluding the one or more drawing guides based on the modified coverage maps; and
selecting one or more additional drawing guides based on the reprioritization.

5. The method of claim 4, further comprising:
repeating a process of selecting and reprioritizing the plurality of candidate guides until a termination condition is met, wherein the termination condition is based on a number of remaining candidate guides or a highest priority score of the remaining candidate guides.

6. The method of claim 1, wherein:
the predetermined set of shape categories consists of a line category, a circle category, an ellipse category, a polygon category or any combination thereof.

7. The method of claim 1, further comprising:
determining that at least one parameter of a candidate guide from the plurality of candidate guides is within a threshold amount for to be considered a simplified shape; and
modifying the candidate guide to create a simplified candidate guide, wherein the plurality of refined candidate guides are created based on the simplified candidate guide.

8. The method of claim 7, wherein:
the simplified shape comprises a circle or a regular polygon.

9. The method of claim 1, further comprising:
determining that the at least two of the plurality of candidate guides have a center point within a threshold distance and a radius within a threshold magnitude of each other, wherein the at least two of the plurality of candidate guides are combined based on the determination.

10. The method of claim 1, further comprising:
determining that the at least two of the plurality of candidate guides have a slope within a threshold magnitude of each other, wherein the at least two of the plurality of candidate guides are combined based on the determination.

11. The method of claim 1, further comprising:
determining that two guides of the one or more drawings guides comprise circles having center points within a threshold distance of each other; and
modifying at least one of the two guides based on the determination.

12. The method of claim 1, further comprising:
determining that two guides of the one or more drawings guides comprise lines having slopes having less than a threshold difference from each other; and
modifying at least one of the two guides based on the determination.

13. The method of claim 1, further comprising:
modifying the digital image based at least in part on the one or more drawing guides.

14. The method of claim 1, further comprising:
generating one or more anchor points for the digital image based at least in part on the one or more drawing guides.

15. The method of claim 14, further comprising:
generating a vector graphics representation of the digital image based at least in part on the anchor points, wherein the digital image is displayed based on the vector graphics representation.

16. The method of claim 1, wherein:
the digital image is based at least in part on a hand sketch.

17. The method of claim 16, further comprising:
digitizing the hand sketch to create the digital image.

18. The method of claim 1, further comprising:
generating a clean version of the digital image by eliminating one or more drawing artifacts using a convolution neural network, wherein the plurality of candidate guides are generated based on the clean version of the digital image.

19. An apparatus for generating drawing guides, comprising:
a processor and a memory storing instructions and in electronic communication with the processor, the processor being configured to execute the instructions to:
generate a plurality of candidate guides for a digital image;
generate a pixel coverage map for each of the plurality candidate guides;
prioritize the plurality of candidate guides based at least in part on the corresponding pixel coverage maps;
select one or more drawing guides from the plurality of candidate guides based at least in part on the prioritization;
remove a set of pixels corresponding to the one or more selected drawing guides;
identify a modified coverage map for each of the plurality candidate guides excluding the one or more drawing guides;
reprioritize a remaining portion of the plurality of candidate guides excluding the one or more drawing guides based on the modified coverage maps;
select one or more additional drawing guides based on the reprioritization; and
repeat a process for selecting and reprioritizing candidate guides until a termination condition is met for generating a complete set of drawing guides.

20. A non-transitory computer readable medium storing code for generating drawing guides, the code comprising instructions executable by a processor to:
generate a plurality of candidate guides for a digital image;
perform automatic edge detection on the digital image to identify a set of edge pixels;
group the set of edge pixels into a plurality of objects;
filter the plurality of object based on a threshold size;
determine whether each of the set of edge pixels corresponds to each of the plurality of candidate guides based on the filtering;
generate a pixel coverage map for each of the plurality of candidate guides based on the determination, wherein the pixel coverage map indicates whether the corresponding refined candidate guide covers occupies pixel of the digital image;
prioritize the plurality of candidate guides based at least in part on the corresponding pixel coverage maps; and
select one or more drawing guides from the one or more refined candidate guides based at least in part on the prioritization.

* * * * *